(12) United States Patent
Ens et al.

(10) Patent No.: US 7,559,239 B2
(45) Date of Patent: Jul. 14, 2009

(54) ACOUSTIC PICK-UP

(75) Inventors: Wolfgang Ens, Linkenheim (DE); Alf Püttmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 10/559,369

(22) PCT Filed: May 28, 2004

(86) PCT No.: PCT/EP2004/005826

§ 371 (c)(1),
(2), (4) Date: Dec. 6, 2005

(87) PCT Pub. No.: WO2004/109249

PCT Pub. Date: Dec. 16, 2004

(65) Prior Publication Data

US 2006/0179948 A1     Aug. 17, 2006

(30) Foreign Application Priority Data

Jun. 6, 2003 (DE) ................. 103 25 801

(51) Int. Cl.
*G01D 7/00* (2006.01)
(52) U.S. Cl. .......................... 73/587; 73/584
(58) Field of Classification Search .......... 73/587, 73/584

See application file for complete search history.

(56) References Cited

U.S. PATENT DOCUMENTS

| 4,091,660 | A | * | 5/1978 | Yanagi | ............. 73/658 |
| 4,237,454 | A | | 12/1980 | Meyer | |
| 6,076,405 | A | * | 6/2000 | Schoess | ............. 73/587 |
| 6,490,929 | B1 | * | 12/2002 | Russell et al. | ............. 73/660 |

FOREIGN PATENT DOCUMENTS

| DE | 39 30 314 A1 | 3/1990 |
| DE | 41 19 147 A1 | 2/1993 |
| DE | 43 12 887 A1 | 11/1993 |
| DE | 44 32 808 A1 | 3/1995 |
| DE | 199 63 608 A1 | 7/2000 |
| DE | 299 12 847 U1 | 10/2000 |
| DE | 199 47 129 A1 | 4/2001 |
| EP | 1 022 702 A2 | 7/2000 |

* cited by examiner

*Primary Examiner*—Hezron Williams
*Assistant Examiner*—Mark Shabman

(57) ABSTRACT

An acoustic pick-up, particularly an ultrasonic pick-up for acoustically diagnosing machines, for example, for detecting leakage in valves or for diagnosing positions, comprising a piezoelectric measuring element and an electronic circuit that processes the measurement signal into a form that is suited for transmission to an evaluation device. In order that the acoustic pick-up can function without an external auxiliary power supply, means are provided by means of which auxiliary power required for operating the electronic circuit can be generated from the acoustic signal to be picked up.

3 Claims, 1 Drawing Sheet

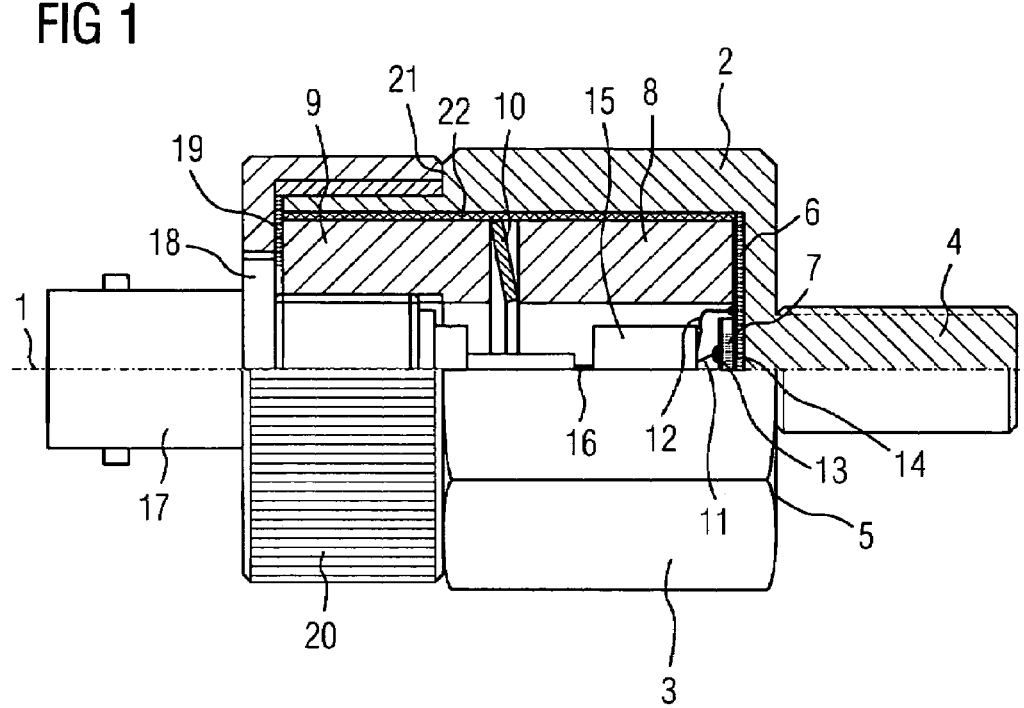
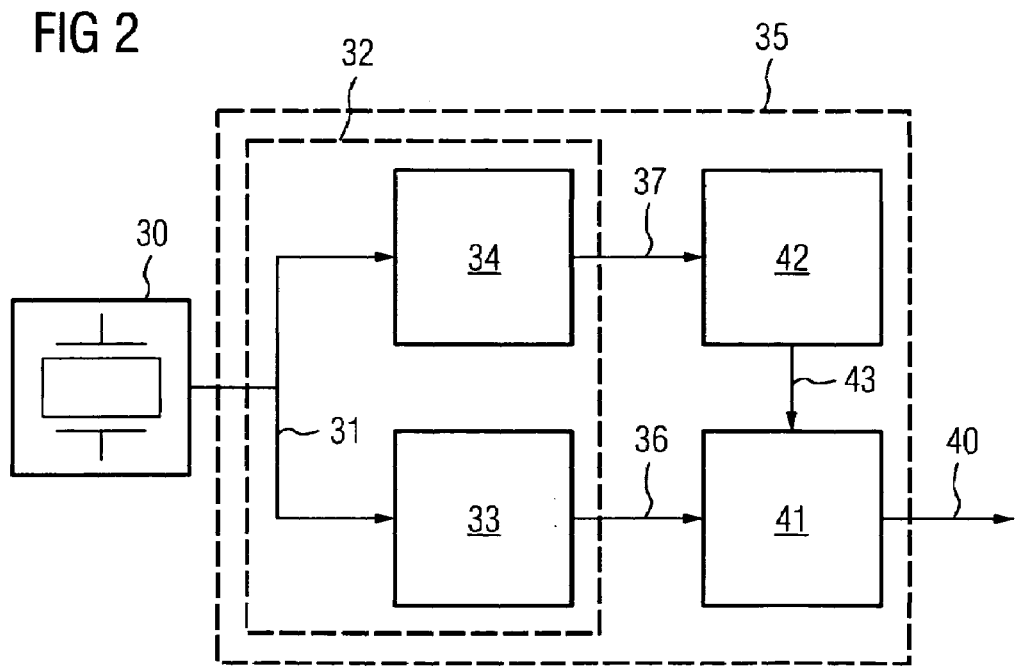

ACOUSTIC PICK-UP

CROSS REFERENCE TO RELATED APPLICATIONS

This application is the US National Stage of International Application No. PCT/EP2004/005826, filed May 28, 2004 and claims the benefit thereof. The International Application claims the benefits of German application No. 10325801.9 DE filed Jun. 6, 2003, both of the applications are incorporated by reference herein in their entirety.

FIELD OF INVENTION

The invention relates to an acoustic pick-up, more particularly an ultrasonic pick-up for acoustically diagnosing machines.

BACKGROUND OF INVENTION

In many areas of process and power engineering that are of relevance to safety the trouble-free operation of a system depends on the smooth functioning of the machines or machine parts employed. In order to avoid costly, erratic interruptions to operation, any damage to valves or bearings, for instance, should as far as possible be detected at the initial stage, which is to say before a component outage can bring the system to a halt. As an instance of this, defective valve seats will result in leakage flows that produce broadband ultrasonic emissions. Picking up and evaluating the ultrasonic emissions of a valve can hence serve to detect valve damage early. An ultrasonic pick-up suitable for picking up the solid-borne sound signal is known from DE 299 12 847 U 1. Said pick-up has a housing containing a piezoelectric measuring element and a circuit for signal conditioning. The conditioned measurement signal can be ducted as an output signal over a cable to a remotely located evaluation device. The auxiliary power required to operate the signal conditioning circuit is supplied by the evaluation device and made available to the acoustic pick-up likewise via the cable. This means an additional device for generating the auxiliary power is required in the evaluation device and additional wires for transmitting said auxiliary power are required in the cable.

A monitoring sensor using wireless signal transmission (wireless transducer) is known from EP 1 022 702 A2, which wireless transducer has, mounted within a housing, a piezoelectric sensing element for generating an electric monitoring signal and an electronic circuit.

The auxiliary energy required to operate the electronic circuit and for signal transmission is obtained from the electric monitoring signal.

A further monitoring system using wireless signal transmission is known from U.S. Pat. No. 4,237,454.

SUMMARY OF INVENTION

An object of the invention is to provide an acoustic pick-up, more particularly an ultrasonic pick-up for acoustically diagnosing machines, which pick-up can function without an external auxiliary power supply and enables a measurement signal to be transmitted in a frequency range that is to be evaluated.

To achieve said object the new acoustic pick-up of the type mentioned at the start has the features described in the claims.

The invention has the advantage that the acoustic pick-up takes the power needed to operate an electronic circuit for signal conditioning from its surroundings so that said power does not have to be supplied to it over separate wires in a cable. As the acoustic pick-up generates the auxiliary power from the acoustic signal requiring to be picked up, sufficient power will always be available for operating the circuit at times when an acoustic signal exceeding a specific minimum intensity is present and a corresponding output signal has to be produced. The output signal can be transmitted to the evaluation device asymmetrically or symmetrically over a cable, for example, or alternatively wirelessly using radio or infrared light.

The auxiliary power is generated from the electric measurement signal of the piezoelectric measuring element. This has the advantage that no further electroacoustic components will be required in addition to the actual measuring element of the acoustic pick-up.

When acoustic pick-ups are used for machine diagnosing, in particular for diagnosing valve leakage or damage to a bearing, evaluating a specific frequency range has proved in most cases adequate for obtaining a diagnostic result. It is known from, for instance, DE 199 47 129 A1 how when valve leakage is being diagnosed to distinguish between a lower spectral range in which mainly the valve's operating noises are located and an upper spectral range predominantly containing fault-generated noises in certain operating conditions. The threshold frequency between said two spectral ranges can be selected to be between 50 kHz and, for example, 200 kHz since the operating noises occur predominantly in a range below 120 kHz. A spectral range of the measurement signal above a frequency of 50 kHz is therefore evaluated for detecting faults, which range does not, however, have to begin directly at 50 kHz. Only signal components in that frequency range have to be amplified and transmitted on a wire-bound basis or wirelessly to the evaluation device. The signal supplied by the piezoelectric measuring element is especially powerful in the frequency range between 0 and 50 kHz because the signal components have a substantially greater amplitude therein. The signal components in that range can advantageously be used for generating the power required for operating the conditioning circuit. There is thus advantageously provided a frequency separating filter by means of which the electric measurement signal of the piezoelectric element is separated essentially into an evaluation signal in a first frequency range, which signal is conditioned into a form suitable for transmitting to an evaluation device located outside the housing, and into a supply signal in a second frequency range, which signal supplies the auxiliary power required for operating the conditioning circuit. A frequency separating filter of said type furthermore offers the advantage that the evaluation signal will be falsified only slightly despite the supply signal being derived from the same electric measurement signal.

A better quality for the auxiliary power for the circuit for signal conditioning and hence a better quality for the output signal will advantageously be achieved if a device for rectifying and smoothing the supply signal is provided.

BRIEF DESCRIPTION OF THE DRAWINGS

The invention as well as embodiments and advantages are explained in more detail below with the aid of the drawings illustrating an exemplary embodiment of the invention:

FIG. 1 is a partial cross-sectional view of an acoustic pick-up and

FIG. 2 is a block diagram of the electronic components of said acoustic pick-up.

DETAILED DESCRIPTION OF INVENTION

Shown in the bottom half of FIG. 1, which is to say below an axis 1, is a side view of an essentially rotationally symmetrically structured acoustic pick-up, and in the top half a longitudinal section through said acoustic pick-up.

According to FIG. 1 the acoustic pick-up has a pot-shaped housing 2 furnished on its exterior with driving flats 3 for a wrench. Provided as a securing means is a threaded stem 4 that can be turned into a corresponding threaded boring at the mounting position. The requisite starting torque can be applied by means of a wrench to ensure good coupling of the vibrations via a contact surface 5 of the housing base at the mounting position. Inside the housing base is an insulating disk 6 of the same material as that also of a piezoelectric element 7 onto which has been soldered a metal-plated side of said insulating disk 6, which side faces a sleeve section 8. Together with a sleeve section 9 and a disk spring 10, said 10, said sleeve section 8 forms a sleeve extending along the entire length of the acoustic pick-up's measuring electronics and constituting a major part of the electromagnetic shielding. Connecting leads 11 and 12 for electrically connecting a signal electrode 13 or, as the case may be, measuring electrode 14 of the piezoelectric measuring element 7 to an electronic circuit 15, the electronic circuit 15 itself, and electric supply leads 16 to the electronic circuit are furthermore shielded within the sleeve from electromagnetic interference. The electronic circuit 15 serves to convert the charge transfers in the piezoelectric measuring element 7 due to acoustic vibrations into a signal that can be transmitted well even over longer distances via a cable or, as an alternative to the exemplary embodiment shown, wirelessly. One basal area of the sleeve is sealed by the electrically conducting metal coating of the insulating disk 6. Said metal coating serves simultaneously as a measuring electrode 14. Within the other basal area the sleeve's inner wall is furnished with an internal thread into which a BNC jack 17 has been turned until a circumferential collar 18 of said BNC jack 17 comes to rest against a seal 19. Other types of plug connectors can, of course, also be used as alternatives to the BNC jack, or the cable can be connected directly in the sleeve. The sleeve is secured in position by a sealing part 20 which at least partially overreaches the sleeve's other basal area and is furnished with an internal thread which has been turned as far as the stop 21 onto a corresponding external thread of the housing 2. Located between the sleeve's end face and the inner wall of the housing 2 is an insulating foil 22. Reference is made to DE 299 12 847 U1 for further details of the acoustic pick-up's structural design.

According to FIG. 2 an acoustic pick-up picks up an acoustic signal by means of a piezoelectric measuring element 30 that converts structure-borne sound into an electric measurement signal 31 over a wide frequency range. Said measurement signal 31 is ducted to a frequency separating filter 32 consisting essentially of a first filter 33 and a second filter 34. The first filter 33 is permeable for the signal components of the electric measurement signal 31 that are above a threshold frequency of 50 kHz. An evaluation signal 36 will therefore contain nothing but higher-frequency components, which in the exemplary embodiment shown are evaluated for diagnosing leaks. When an output signal 40 is transmitted over a cable to a remotely located evaluation device (not shown in the drawing), an amplifier 41 serves to condition the evaluation signal 36 into a form suitable for transmission. For wireless transmission, as an alternative to the exemplary embodiment shown it would be possible additionally to provide an HF modulator and an antenna for generating a corresponding radio signal as the output signal in the conditioning circuit 35. The second filter 34 is permeable for the signal components of the electric measurement signal 31 that are below a threshold frequency of 50 kHz and, although having a large amplitude, are of secondary importance for obtaining a diagnostic result. A supply signal 37 passing through the filter 34 is rectified and smoothed in a device 42. A smoothed supply signal 43 is thus available for the amplifier 41 so that good quality can be ensured for the output signal 40. The filters 33 and 34, the amplifier 41, and the device 42 are hence constituent parts of the electronic circuit which conditions the electric measurement signal 31 into a form suitable for transmitting to an evaluation device located outside the acoustic pick-up housing and which thereby advantageously functions without an external auxiliary power supply.

As an alternative to the exemplary embodiment shown, for generating a supply signal it is of course possible to provide a further electroacoustic transducer which from the acoustic signal requiring to be picked up supplies a powerful electric signal from which can be generated the auxiliary power for a circuit for conditioning the measurement signal. An additional transducer of said type can, however, be advantageously omitted from the exemplary embodiment described.

The invention claimed is:

1. An ultrasonic pick-up for acoustically diagnosing machines of the type generating normal operating noise in a relatively low spectral range and which generate fault-related noise in a relatively high spectral range which may overlap with the relatively low spectral range, comprising:
   a piezoelectric measuring element for generating an electric measurement signal;
   a housing that includes the piezoelectric measuring element;
   an electronic circuit operatively connected to the piezoelectric measuring element, the electronic circuit coupled to convert the electric measurement signal into a relatively high frequency component providing an evaluation signal in the relatively high spectral range, for suitable evaluation and (ii) into a relatively low frequency component providing a supply signal in the relatively low spectral range suitable to provide power for operating the circuit, the circuit including:
   a filter function for separating the electric measurement signal so that the evaluation signal only has frequency components above a threshold value and the supply signal only has frequency components below the threshold value; and
   an amplifier positioned after the filter function to only amplify the evaluation signal so that it is suitable for transmission to an evaluation device located outside of the housing, so that the supply signal is not amplified by the amplifier.

2. The ultrasonic pick-up according to claim 1, wherein the electronic circuit further comprises a rectifying device for rectifying and smoothing the supply signal.

3. The ultrasonic pick-up according to claim 1 wherein the relatively high spectral range of the first signal overlaps with the relatively low spectral range of the second signal.

* * * * *